United States Patent [19]

Tsuchiya et al.

[11] Patent Number: 5,001,172

[45] Date of Patent: Mar. 19, 1991

[54] FIBER REINFORCED PLASTICS

[75] Inventors: Yasuhiro Tsuchiya, Nagoya; Kenichi Sekiyama, Gotenba; Yuji Kageyama, Anjo; Masatsugu Sakamoto, Toyota; Norio Sato, Nagoya; Shigetoshi Sugiyama, Toyota; Toshio Kurauchi, Nagoya, all of Japan

[73] Assignees: Kabushiki Kaisha toyota Chuo Kenkyusho, Aichi; Toyota Jidosha Kabushiki Kaisha, Toyota, both of Japan

[21] Appl. No.: 286,172

[22] Filed: Dec. 19, 1988

[30] Foreign Application Priority Data

Dec. 19, 1987 [JP] Japan .................. 62-322375

[51] Int. Cl.$^5$ .......................... C08K 7/14; C08K 7/06
[52] U.S. Cl. .................................. 523/220; 523/222; 523/444; 523/513; 524/494; 524/496
[58] Field of Search ............... 523/220, 222, 444, 513; 524/494, 496; 428/325

[56] References Cited

U.S. PATENT DOCUMENTS 4,101,709  7/1978  Whang et al. .................. 428/325
4,107,134  8/1978  Dawans ......................... 524/494

FOREIGN PATENT DOCUMENTS 69-219374  12/1984  Japan .

OTHER PUBLICATIONS

"Carbon Fiber", Published by Ohm Co. On Feb. 20, 1984 pp. 13–15.
"Reinforced Plastic Handbook", Published by Nikkan Kogyo Shinbun Co. Published on May 15, 1975 pp. 90–92 & 105–117.

*Primary Examiner*—Lewis T. Jacobs
*Attorney, Agent, or Firm*—Oblon, Spivak, McClelland, Maier & Neustadt

[57] ABSTRACT

A fiber reinforced plastics comprises a resin and chopped strands dispersed in the resin, wherein the chopped strands comprise glass fiber chopped strands composed of cut assemblies of glass filaments and high elastic chopped strands composed of cut assemblies of high modulus inorgtanic filaments having higher elastic modulus than the filaments and having 3000 or less number of assembled filaments. By this arrangement, the both chopped strands are closely and uniformly dispersed in the resin and the force interaction between the both chopped stands are enhanced. The resultant plastics has remarkably improved strength and fatigue durability, and higher rigidity than conventional ones.

3 Claims, 11 Drawing Sheets

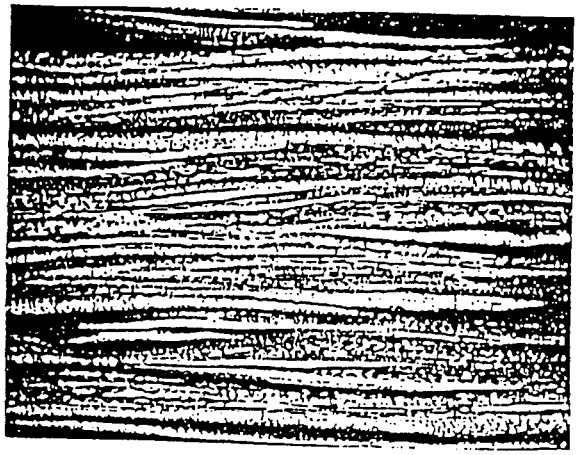
This Invention (Strand Cross Sectional Area: 0.05 mm²)
FIG. 10 (Magnification X 25)
Total Fiber: 40 vol. %
G-Fiber/C-Fiber: 9/1
Prior Art (Strand Cross Sectional Area: 0.6 mm²)
FIG. 11 (Magnification X 25)

This Invention (Lateral Cross Section After Breaking)
FIG. 12   (Magnification X 25)
Prior Art (Lateral Cross Section After Breaking)
FIG. 13 (Magnification X 25)

FIBER REINFORCED PLASTICS

BACKGROUND OF THE INVENTION

1. Field of the Invention

This invention relates to a fiber reinforced plastics having good rigidity, strength and fatigue durability, and particularly to a fiber reinforced plastics in which chopped strands comprising a plurality of filaments are finely dispersed in matrix resin.

2. Related Art Statement

A sheet molding compound or SMC is generally called a G-SMC when it comprises a glass fiber strand. The glass fiber strand is an assembly of a predetermined number of independent glass filaments. The number of the independent glass filaments is usually from 200 to 400. The glass fiber strand is cut to a predetermined length, usually to 1 inch, and dispersed in matrix resin like thermosetting resin, thereby producing a reinforced G-SMC. When an SMC comprises an inorganic fiber strand, for instance, a carbon fiber strand, having elastic modulus higher than that of the glass fiber strand, it is called a C-SMC. A carbon fiber strand having high strength and elastic modulus is employed to adapt the C-SMC for structural material usage.

According to the description on pages 13-15 of "Carbon Fiber" published by Ohm Co. on Feb. 20, 1984, and pages 90-92 and pages 105-117 of "Reinforced Plastic Handbook" published by Nikkan Kogyo Shinbun Co. on May 15, 1975, the G-SMC comprising glass fiber strands has the following characteristics:

(a) It is easy to handle and offers high productivity since it is sheet-shaped and less tacky. The SMC is solid so that it allows easy cutting and measuring and enables automated molding.

(b) It exhibits viscosity less likely to decrease in a mold during molding. Thus, the G-SMC flows uniformly into cavities of intricated configurations and a molded substance of good physical properties can be obtained. Further, moldings having variable thickness, ribs and bosses can be molded, and they have good glossy surfaces with less embossing glass fibers.

Recently, there has been proposed mixing carbon fiber chopped strands into glass fiber chopped strands, or contrarily mixing glass fiber chopped strands into carbon fiber chopped strands in order to improve the conventional G-SMC and C-SMC. Such composition in which different fibers are mixed to hybridize is generally called a hybrid SMC.

Although the conventional hybrid SMC has improved rigidity, it has not offered sufficient improvements in strength and fatigue durability. This is due to the fact that since carbon fiber chopped strands comprise a large number of assembled filaments, the structure of the resultant hybrid SMC is not uniform, causing the concentration of stress around such carbon fiber chopped strands.

SUMMARY OF THE INVENTION

It is therefore an object of this invention to provide a fiber reinforced plastics having better rigidity, strength and fatigue durability than the conventional hybrid SMC.

A fiber reinforced plastics of this invention comprises resin and chopped strands dispersed in the resin, wherein the chopped strands comprise glass fiber chopped strands comprising cut assemblies of glass filaments and high modulus chopped strands comprising cut assemblies of high modulus inorganic filaments having higher elastic modulus than the glass filaments and 3000 or less number of assembled filaments (i.e. much smaller number of filaments as compared with the conventional ones). By this arrangement, the both chopped strands are closely and uniformly dispersed in the resin and the stress concentration caused around high modulus chopped strands in the conventional hybrid SMC hardly occurs.

The chopped strand means a cut strand. The two strands are cut simultaneously in this invention, namely the glass fiber chopped strand cut from the glass fiber strand and the high modulus chopped strand cut from the inorganic fiber strand having 3000 or less number of assembled filaments are employed in this invention.

In this invention, the number of the assembled high modulus inorganic filaments composing the high modulus chopped strand is made 3000 or less so as to decrease the cross sectional area of the high modulus chopped strands. When the amount of the high modulus chopped strands is constant, the number of the high modulus chopped strands in a unit volume increases more than the conventional ones, thereby finely dispersing the high modulus chopped strands and improving rigidity and strength of the plastics.

The relationship between the number of assembled filaments of the carbon fiber chopped strand in the embodiments of the present invention and the cross sectional area thereof is shown in Table 1 below.

TABLE 1

| | Number of Assembled Filaments | | | | | |
|---|---|---|---|---|---|---|
| | 12000 | 6000 | 3000 | 1000 | 500 | 200 |
| Cross Sectional Area (mm$^2$) | 0.6 | 0.3 | 0.15 | 0.05 | 0.025 | 0.01 |

In more detail, the fiber reinforced plastics has come to have the following arrangements (a) to (d) because of the finely dispersed high modulus chopped strands.

(a) The high modulus chopped strands tend to be disposed adjacent to the surface of molded plate at a high rate (See FIGS. 10 and 11.). Namely, the probability of the high modulus chopped strands to be disposed adjacent to the surface of molded plate increases because the number of the high modulus chopped strands in a unit volume has increased.

For many cases, an SMC molded plate is used for parts subjected to bending load. When the high modulus chopped strands are disposed adjacent to the surface of the molded plate in accordance with this invention, the rigidity and strength of the molded plated increase because the high modulus chopped strands bears the stress. But, the effect of this invention diminishes when the high modulus chopped strands occupy more than 30% by volume of the total volume of the chopped strands. This is believed that the molded plate according to this invention hardly differs from the conventional SMC molded plate because too many high modulus chopped strands are disposed adjacent to the surface of the molded plate when the high modulus chopped strands occupy more than 30% by volume.

For example, the number of the high modulus chopped strands in a unit volume increases to 60 times of that of the conventional SMC molded plate (number of filaments: 12,000; cross sectional area: 0.6 mm$^2$) when the number of assembled filaments of the high modulus chopped strands is made to be 200 or less (e.g. when the cross sectional area is made to be 0.01 mm² or less as in the embodiments of the present invention). The number of the high modulus chopped strands disposed adjacent to the surface of the molded plate thus increases, however, the apparent density of the chopped strands aggregate increases extraordinarily before resin composition impregnation. Consequently, the incomplete resin composition impregnation is more likely to occur when the number of the high modlus chopped strands in a unit volume increases too much. The incomplete resin composition impregnation results in defects, and the strength of the molded plate deteriorates.

(b) A large number of the high modulus chopped strands cross each other. Namely, the number of bridging high modulus chopped strands increases because the number of the high modulus chopped strands in a unit volume has increased.

On the other hand, the conventional SMC molded plate has less number of the high modulus chopped strands in a unit volume, and the high modulus chopped strands are more likely to disperse than to cross each other. When one of the high modulus chopped strands disperses independently, the stress concentrates on the single high modulus chopped strand, and breakages are more likely to occur adjacent to the single high modulus chopped strand, and thereby the strength of the SMC molded plate deteriorates. Therefore, it is effective for avoiding the concentrated stress to disperse the stress by bridging the high modulus chopped strands.

In this invention, the number of bridging high modulus chopped strands has increased remarkably, because the number of the high modulus chopped strands in a unit volume is 12 times of that of the conventional SMC molded plate when the cross sectional area of the high modulus chopped strands is made to 0.05 mm², and because the number is 60 times of that of the conventional SMC molded plate when the cross sectional area of the high modulus chopped strands is made to 0.01 mm². As a result, the stress is dispersed uniformly and the strength of the molded plate of this invention is improved.

However, when the cross sectional area is made to less than 0.01 mm², the incomplete resin composition impregnation is more likely to occur, and the strength of the molded plate deteriorates even though the number of bridging high modulus chopped strands has increased.

(c) The sum of the lateral surface area of the high modulus chopped strands increases, as the cross sectional area of the high modulus chopped strands decreases. This is because the number of the high modulus chopped strand in a unit volume has increased.

For instance, let assume a conventional strand having 0.6 mm² cross sectional area be a cylinder, the diameter is 0.874 mm. Let the length of the conventional strand be 1, the lateral surface area is 2.745 1mm². On the other hand, the high modulus chopped strand having 0.05 mm² cross sectional area according to this invention, the diameter is 0.2523 mm and the lateral surface area is 0.792 1mm². The sum of the lateral surface are is therefore 9.510 1mm² because the number of the high modulus chopped strand in a unit volume is 12 times of that of the conventional high modulus chopped strands. The sum of the lateral surface area of the high modulus chopped strands according to this invention is thus 3.5 times of that of the conventional high modulus chopped strands. As a result, the strength and rigidity of the molded plate according to this invention has improved. It is believed that these improvements result from remarkably improved stress transmission effect due to the increased sum of the lateral surface area.

(d) The crack mechanism of the molded plate has changed. (See FIGS. 12 and 13.)

When a load is applied to the SMC molded plate in which the glass fiber chopped strands and the high modulus chopped strands are hybridized, large shearing forces generate at the boundaries between the glass fiber chopped strands and the high modulus chopped strands because the elastic moduli of the glass fiber chopped strands and the high modulus chopped strands differ greatly. Consequently, cracks occur at the boundaries and propagate along the boundaries. In the conventional hybrid SMC, the cracks propagate abruptly and linearly and result in an instant crack of the SMC plate, because the chopped strands have a large cross sectional area.

In the molded plate of this invention, however, the cracks are small if they occur, because the chopped strands have a small cross sectional area. The cracks do not propagate linearly, but they branch away and propagate gradually because the chopped strands are finely dispersed. Accordingly, the strength of the molded plate of this invention is high and the fatigue durability thereof has been improved sharply.

The mixing ratio of a total of the chopped strands preferably falls in the range of from 30 to 50% by volume with respect to the total volume of the fiber reinforced plastics taken as 100% by volume. When the mixing ratio is less than 30% by volume, the strength of the fiber reinforced plastics is so small that it is not appropriate for industrial material. When the mixing ratio is more than 50% by volume, the strength of the fiber reinforced resin composition decreases because incomplete impregnation often occurs.

The length of the chopped strands preferably falls in the range of from ¼ to 2 inch, and more preferably in the range of ½ to 3/2 inch. When the length is less than ½ inch, the strength of the fiber reinforced plastics is so small that it is not appropriate for industrial material. When the length is more than 3/2 inch, the linearity of the strands diminishes and the strength of the fiber reinforced plastics decreases because incomplete impregnation often occurs. Further, it is preferred that the chopped strands are dispersed randomly in plane in the fiber reinforced plastics.

The mixing ratio of the high modulus chopped strands comprising cut assemblies of high modulus inorganic filaments preferably falls in the range of from 2 to 30% by volume with respect to the total volume of the chopped strands taken as 100% by volume. When the mixing ratio is less than 2% by volume, the amount of the high modulus chopped strands is so small that effect of hybridizing deteriorates. When the mixing ratio is more than 30% by volume, effect of hybridizing deteriorates again.

The cross sectional area of the high modulus chopped strands comprising cut assemblies of high modulus inorganic filaments preferably falls in the range of from 0.01 to 0.15 mm². When the cross sectional area is less than 0.01 mm², the rigidity and strength of the fiber reinforced plastics decrease because the incomplete impregnation of the resin occurs and results in defects. This occurs because the high modulus chopped strands are dispersed so finely that apparent density becomes too high. When the cross sectional area is more than 0.15 mm², the rigidity and strength of the fiber reinforced plastics decreases again.

The resin to be impregnated in the glass fiber chopped strands and the high modulus chopped strands may preferably be unsaturated polyester, epoxy or vinyl ester themosetting resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a photograph of a cross section of a fiber reinforced plastics of a seventh preferred embodiment according to this invention;

FIG. 11 is a photograph of a cross section of a fiber reinforced plastics of a prior art;

FIG. 12 is a photograph of a lateral cross section of the fiber reinforced plastics of the seventh preferred embodiment according to this invention after breaking; and FIG. 13 is a photograph of a lateral cross section of the fiber reinforced plastics of the prior art after breaking.

DETAILED DESCRIPTION OF THE PREFERRED EMBODIMENTS

Having generally described this invention, a further understanding can be obtained by reference to certain specific preferred embodiments which are provided herein for purposes of illustration only and are not intended to be limiting unless otherwise specified.

The fiber reinforced plastics according to the present invention may be manufactured by the conventional method. For example, the hybrid SMC may be manufactured as follows.

Figure 1:
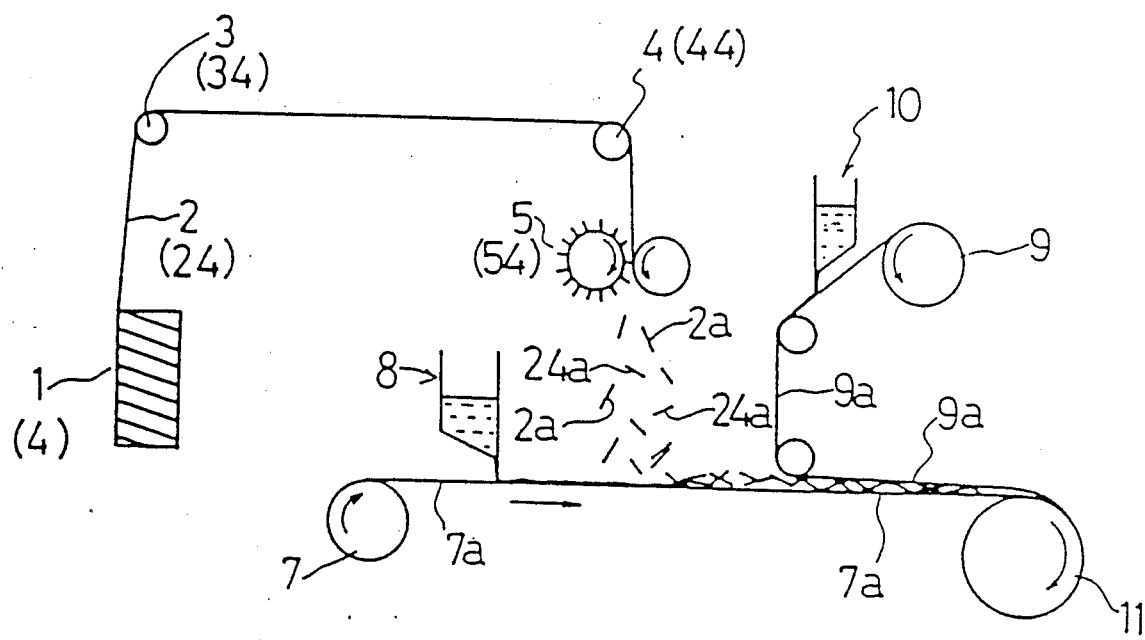
FIG. 1 is a schematic illustration on an arrangement of a manufacturing apparatus for fiber reinforced plastics of first preferred embodiments according to this invention.

As illustrated in FIG. 1, a glass fiber strand 2 was fed out of a roving 1 winding the glass fiber strand 2. Simultaneously, a carbon fiber strand 24 was fed out of a roving 4 winding the carbon fiber strand 24. The roving 4 was disposed in a distance away from the roving 1 in a manner superimposing with the roving 1 in the axial direction.

The glass fiber strand 2 was transferred to a chopper 5 by way of guide rollers 3 and 4. The carbon fiber strand 24 was transferred to a chopper 54 (not shown) by way of guide rollers 34 and 44 (not shown). The guide rollers 34 and 44 were disposed next to the guide rollers 3 and 4 in a coaxial manner with the guide rollers 3 and 4 respectively, and the chopper 54 was disposed next to the chopper 5 in a coaxial manner with the chopper 5. The glass fiber strand 2 and the carbon fiber strand 24 were cut with the choppers 5 and 54 to glass fiber chopped strands 2a and carbon fiber chopped strands 24a having a length of approximately 1 inch, and fell in a state of filaments assemblies. The falling glass fiber chopped strands 2a and the carbon fiber chopped strands 24a deposited on a plastic sheet 7a which was provided out of a first sheet roller 7. A resin was coated on the plastic sheet 7a. The resin comprised an unsaturated polyester, an organic peroxide for hardening, a release agent and a viscosity increasing agent, and was provided out of a first resin container 8.

The plastic sheet 7a travelled gradually in the right direction in FIG. 1, and the glass fiber chopped strands 2a and the carbon fiber chopped strands 24a were distributed evenly on the plastic sheet 7a in a compounded state without depositing at one place on the plastic sheet 7a. The glass fiber chopped strands 2a and the carbon fiber chopped strands 24a were dispersed randomly in plane on the plastic sheet 7a because the glass fiber chopped strands 2a and the carbon fiber chopped strands 24a oriented in arbitrary directions during their falling.

Then, another plastic sheet 9a covered the glass fiber chopped strands 2a and the carbon fiber chopped strands 24a. The plastic sheet 9a was provided out of a second sheet roller 9, and coated with the same resin composition described above. The resin composition was provided out of a second resin container 10.

In this way, the resin composition impregnated the glass fiber chopped strands 2a and the carbon fiber chopped strands 24a from the top and bottom. The glass fiber chopped strands 2a and the carbon fiber chopped strands 24a held between the top plastic sheet 9a and the bottom plastic sheet 7a were wound around a winding roller 11 while being impregnated with the resin composition, thereby obtaining a hybrid SMC in which the glass fiber chopped strands 2a and the carbon fiber chopped strands 24a were randomly dispersed. The hybrid SMC thus obtained may be cut into a predetermined size, and the cut hybrid SMC's with a single layer may be laminated into a multi-layered hybrid SMC after peeling the top and bottom plastic film sheets 9a and 7a off. Molding of the hybrid SMC was done in a die by heating and pressurizing, thereby hardening the resin.

The conventional hybrid SMC generally employs a carbon fiber strand having 12,000 or more assembld carbon filaments to be supplied from the roving 4, while the present invention employs the carbon fiber strand having 3000 or less assembled filaments. According to the present invention, the conventional carbon fiber strand having 12,000 or more filaments may be divided into strand having 3000 or less filaments by improving the conventional chopper 54 to cut the strand to a predetermined length as usual and in addition to simultaneously divide the strand in the axial direction thereof.

The hybrid SMC according to the present invention in which the glass fiber strands and thin high-modulus strands are finely dispersed, has higher rigidity and remarkably improved strength and fatigue durability, as compared with the conventional hybrid SMC in which the glass fiber strands and thick high-modulus strands are nonuniformly dispersed. Especially, the hybrid SMC if employing even mechanical properties a small amount of the high modulus inorganic fiber strands according to the present invention will exhibit much improved mechanical properties, as compared with the G-SMC consisting of glass fiber strands alone. The high modulus inorganic fiber strands are generally expensive. According to this invention, the use of even a small amount of the high modulus inorganic fiber strands will provide better properties than the conventional ones. Further, the hybrid SMC having better quality can be obtained at a low price by the conventional manufacturing process.

First Preferred Embodiments

The relationship between the number of assembled filaments of the carbon fiber chopped strand and the cross sectional area thereof is shown in Table 1. Hybrid SMC's of these first preferred embodiments comprised glass fiber chopped strands comprising approximately 200 of assembled glass filaments and carbon fiber chopped strands comprising 3000 or less of assembled carbon filaments. The glass fiber chopped strands and the carbon fiber chopped strands were compounded and dispersed in unsaturated polyester resin.

In these first preferred embodiments, the number of assembled carbon filaments employed was 500, 1000, and 3000, respectively, and three hybrid SMC's were manufactured as described above with respect to FIG. 1. The sum of the volume of the glass fiber strand 2 and the carbon fiber strand 24 was 40% by volume with respect to the total volume of the hybrid SMC molding, and the ratio of the carbon fiber strand 24 to the glass fiber strand 2 was 1:9 by volume.

Although the glass fiber strand 2 and the carbon fiber strand 24 were fed out of the independent rovings 1 and 4, and cut with the independent choppers 5 and 54 in the manufacturing process, the both strands 2 and 24 may be cut with a common chopper.

For evaluating the hybrid SMC of these first preferred embodiments, two hybrid SMC's, i.e. Comparative Examples 1 and 2 were manufactured by the same manufacturing process. Comparative Examples 1 and 2 employed a conventional carbon fiber strand comprising 6000 of assembled carbon fiber filaments and 12000 thereof, respectively. In addition, a conventional G-SMC, in which glass fiber chopped strands only and a resin were integrated, was manufactured and molded as Comparative Example 3 for the evaluation.

Evaluation 1

For evaluation, 10 pieces each of the hybrid SMC's with a single layer of these first preferred embodiments and Comparative Examples 1 through 3 were laminated and respectively molded into a plate-shaped molding having a thickness of 3 mm under a molding temperature of 150° C. and a molding pressure of 150 kg/cm$^2$ for 3 minutes.

The mechanical properties of the hybrid SMC moldings and G-SMC molding thus obtained were evaluated. Results of the evaluation are summarized in Table 2. The bending modulus and bending strengths were measured by subjecting a testpiece having a width of 25 mm and a thickness of 3 mm to a 3-point bending test of 80 mm span distance. The acoustic emission was measured during the 3-point bending test. A fatigue durability test was conducted to a testpiece having a length of 220 mm, a width of 20 mm and a thickness of 3 mm under the following tensile conditions:

Frequency: 10 Hz
Minimum stress: 1 kg/mm$^2$
Maximum stress: 10 kg/mm$^2$

The fatigue durability test was conducted until the testpiece broke, and values for the fatigue durability test in Table 2 are numbers of cycles of the loads application when the testpieces broke.

TABLE 2

| | Effect of Number of Assembled Carbon Fiber Filaments | | | | | |
|---|---|---|---|---|---|---|
| | First Preferred Embodiments | | | Comparative Example 1 | Comparative Example 2 | Comparative Example 3 |
| Chopped Strands | | | | | | |
| Number of Assembled Carbon Fiber Filaments | 500 | 1000 | 3000 | 6000 | 12000 | — |
| Sectional Area of Fiber Filaments (mm$^2$) | 0.025 | 0.05 | 0.15 | 0.3 | 0.6 | — |
| Chopped Strands (vol %) (Carbon Fiber Strand/ Glass Fiber Strand) | 40 (1:9) | 40 (1:9) | 40 (1:9) | 40 (1:9) | 40 (1:9) | 40 (0:10) |
| Resin Composition | | | | | | |
| Unsaturated Polyester | 100 | 100 | 100 | 100 | 100 | 100 |
| Peroxide for Hardening | 1 | 1 | 1 | 1 | 1 | 1 |
| Release Agent | 4 | 4 | 4 | 4 | 4 | 4 |
| Viscosity Increasing Agent | 6 | 6 | 6 | 6 | 6 | 6 |
| Mechanical Properties | | | | | | |
| Bending Modulus (kgf/mm$^2$) | 2200 | 2200 | 2100 | 2000 | 1900 | 1700 |
| Bending Strength (kgf/mm$^2$) | 49.9 | 49.7 | 47.2 | 41.0 | 41.5 | 38.0 |
| Number of Repeated Tensile Load Applications at Breakage | $5 \times 10^6$ | $2.1 \times 10^6$ | $2.8 \times 10^6$ | $1.7 \times 10^5$ | $4.5 \times 10^5$ | $1.3 \times 10^6$ |

It is apparent from Table 2 that the hybrid SMC's of these first preferred embodiments, in which 10% by volume of the total chopped strands volume was substituted with the carbon fiber strand comprising 500, 1000 and 3000 of assembled carbon filaments, have remarkably improved mechanical properties compared with those of the hybrid SMC's of Comparative Examples 1 and 2, in which 10% by volume of the total chopped strands volume was substituted with the carbon fiber strand comprising 6000 and 12000 of assembled carbon filaments, and the conventional G-SMC of Comparative Example 3, in which the glass fiber chopped strands occupied 100% of the fiber component.

Figure 2:
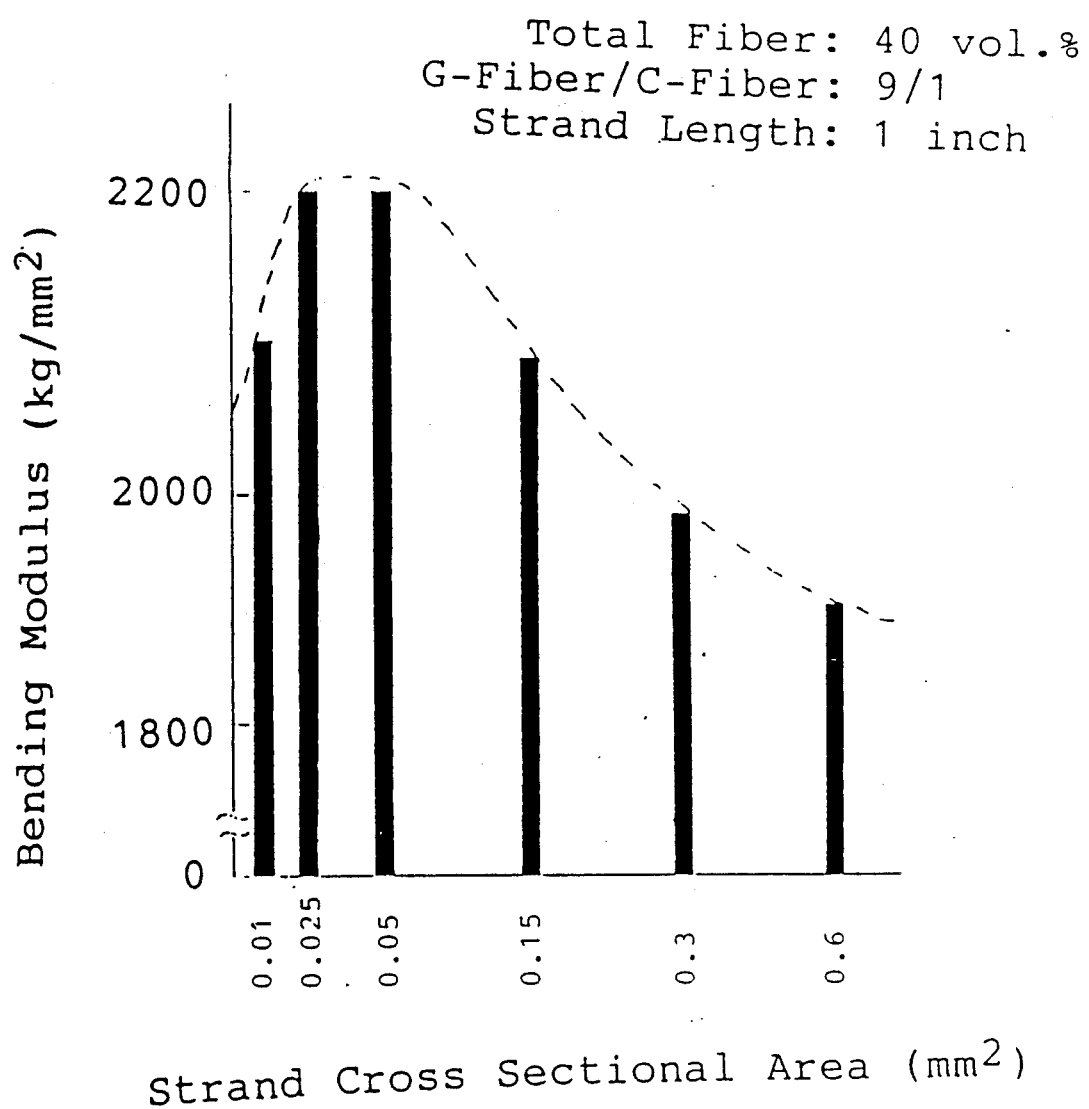
FIG. 2 is a bar chart showing bending modulus of first preferred embodiments according to this invention.
Figure 3:
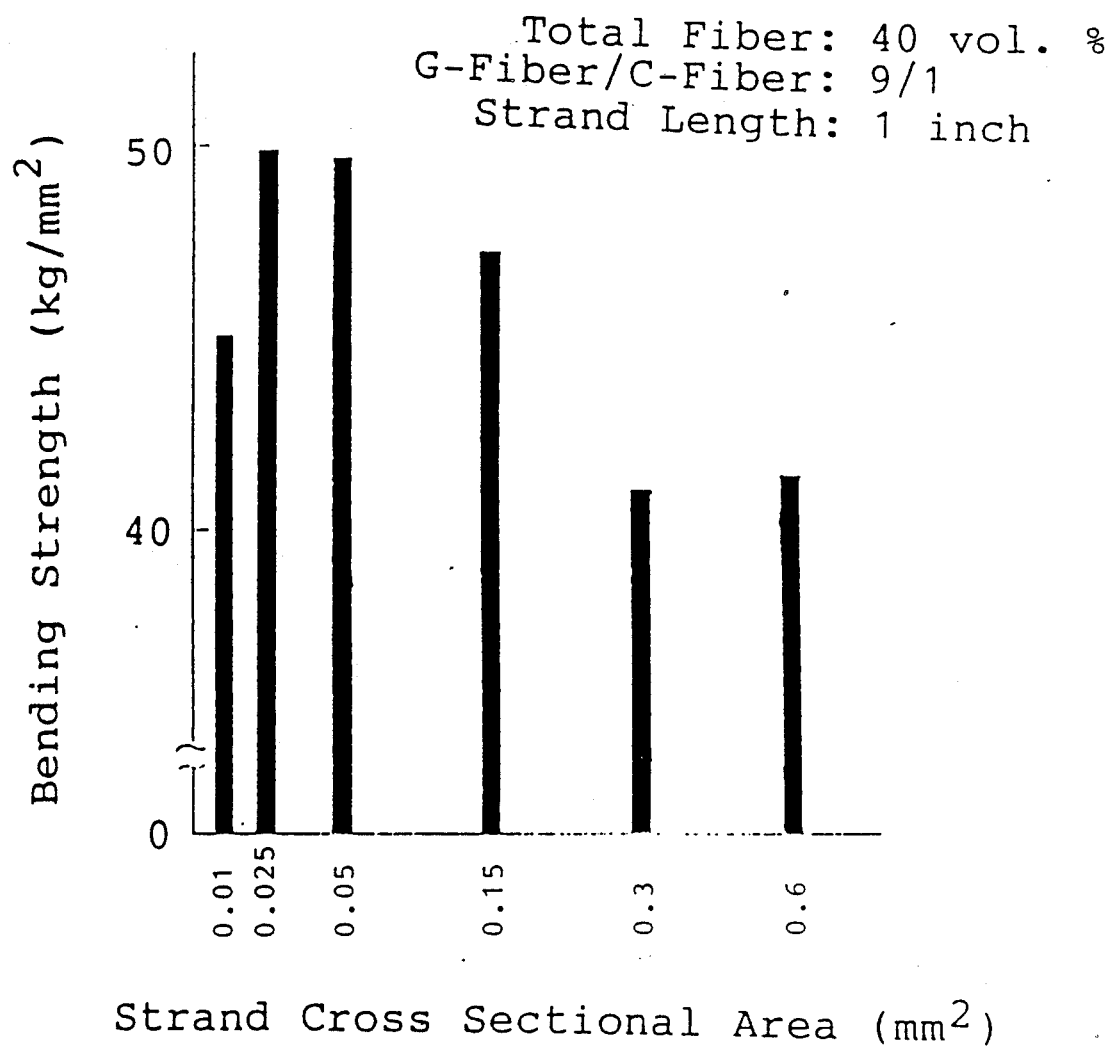
FIG. 3 is a bar chart showing bending strengths of first preferred embodiments according to this invention.

Bending rigidity and bending strength in Table 2 are shown in FIGS. 2 and 3, respectively, in which the data is based on the cross sectional area of the carbon fiber strand. These Figures also include the additional data of 0.01 mm² (i.e. 200 in terms of the number of fiber filaments) as to the cross sectional area of the strand. As is apparent from FIGS. 2 and 3, bending modulus and bending strength are remarkably improved when the cross sectional area in the range of 0.01 to 0.15 mm² is employed, as compared with the larger cross sectional area of 0.6 mm².

Second Preferred Embodiments

These hybrid SMC's with a single layer of these second preferred embodiments comprised glass fiber chopped strands, carbon fiber chopped strands and unsaturated polyester resin, and were manufactured by the same manufacturing process as described in the above First Preferred Embodiments section. But the ratio of the carbon fiber strand to the glass fiber strand was varied from 1:9, to 2:8 and to 3:7 in the three hybrid SMC's, and the sum of the carbon fiber strand and the glass fiber strand was 40% by volume with respect to the total volume of the hybrid SMC taken as 100% by volume. In addition, the carbon fiber strand comprised 1000 of assembled carbon filaments in the hybrid SMC's of these second preferred embodiments.

Evaluation 2

Similarly, three hybrid SMC's (Comparative Examples 1) employing a carbon fiber strand having 12000 of assembled carbon filaments by the same ratios with respect to the glass fiber strand as above-mentioned and, a G-SMC (Comparative Example 2), in which the glass fiber chopped strands occupied 100% of the fiber component, were manufactured for evaluating the hybrid SMC's of these second preferred embodiments.

Namely, 10 pieces each of the hybrid SMC's with a single layer of these second preferred embodiments, Comparative Examples 1 and the G-SMC (Comparative Example 2) were laminated and respectively molded into a plate-shaped molding having a thickness of 3 mm under a molding temperature of 150 °C. and a molding pressure of 150 kg/cm² for 3 minutes. These seven plate-shaped moldings were subjected to the same tests as described in the section of Evaluation 1 for evaluating their bending modulus, bending strength and fatigue durability. Results of the evaluation are summarized in Table 3.

TABLE 3

| | Effect of Carbon Fiber Strand Compounding Amount | | | | | | |
|---|---|---|---|---|---|---|---|
| | Second Preferred Embodiments | | | Comparative Examples 1 | | | Comparative Example 2 |
| Chopped Strands | | | | | | | |
| Number of Assembled Carbon Fiber Filaments | 1000 | 1000 | 1000 | 12000 | 12000 | 12000 | — |
| Sectional Area of Fiber Filaments (mm²) | 0.05 | 0.05 | 0.05 | 0.6 | 0.6 | 0.6 | — |
| Chopped Strands (vol %) (Carbon Fiber Strand/ Glass Fiber Strand) | 40 (1:9) | 40 (2:8) | 40 (3:7) | 40 (1:9) | 40 (2:8) | 40 (3:7) | 40 (0:10) |
| Resin Composition | | | | | | | |
| Unsaturated Polyester | 100 | 100 | 100 | 100 | 100 | 100 | 100 |
| Peroxide for Hardening | 1 | 1 | 1 | 1 | 1 | 1 | 1 |
| Release Agent | 4 | 4 | 4 | 4 | 4 | 4 | 4 |
| Viscosity Increasing Agent | 6 | 6 | 6 | 6 | 6 | 6 | 6 |
| Mechanical Properties | | | | | | | |
| Bending Modulus (kgf/mm²) | 2200 | 2400 | 2600 | 1900 | 2000 | 2600 | 1700 |
| Bending Strength (kgf/mm²) | 49.7 | 45.7 | 46.5 | 41.5 | 41.6 | 40.5 | 38 |
| Number of Repeated Tensile Load Applications at Breakage | $2.1 \times 10^6$ | $1.4 \times 10^6$ | $10^7$ | $4.5 \times 10^5$ | $8.8 \times 10^5$ | $1.7 \times 10^5$ | $1.3 \times 10^6$ |

According to Table 3, it is understood that the hybrid SMC's made of the fiber reinforced resin compositions of these second preferred embodiments generally have improved mechanical properties compared with those of the hybrid SMC's of Comparative Examples 1 and the G-SMC (Comparative Example 2). Especially, the hybrid SMC made of the fiber reinforced resin composition of these second preferred embodiments, in which 10% by volume of the total chopped strands volume was substituted with the carbon fiber strand comprising 1000 of assembled carbon filaments, has good bending strength increased by approximately 20% with respect to that of the hybrid SMC, in which 10% by volume of the total chopped strands volume was substituted with the carbon fiber strand comprising 12000 of assembled carbon filaments.

Figure 4:
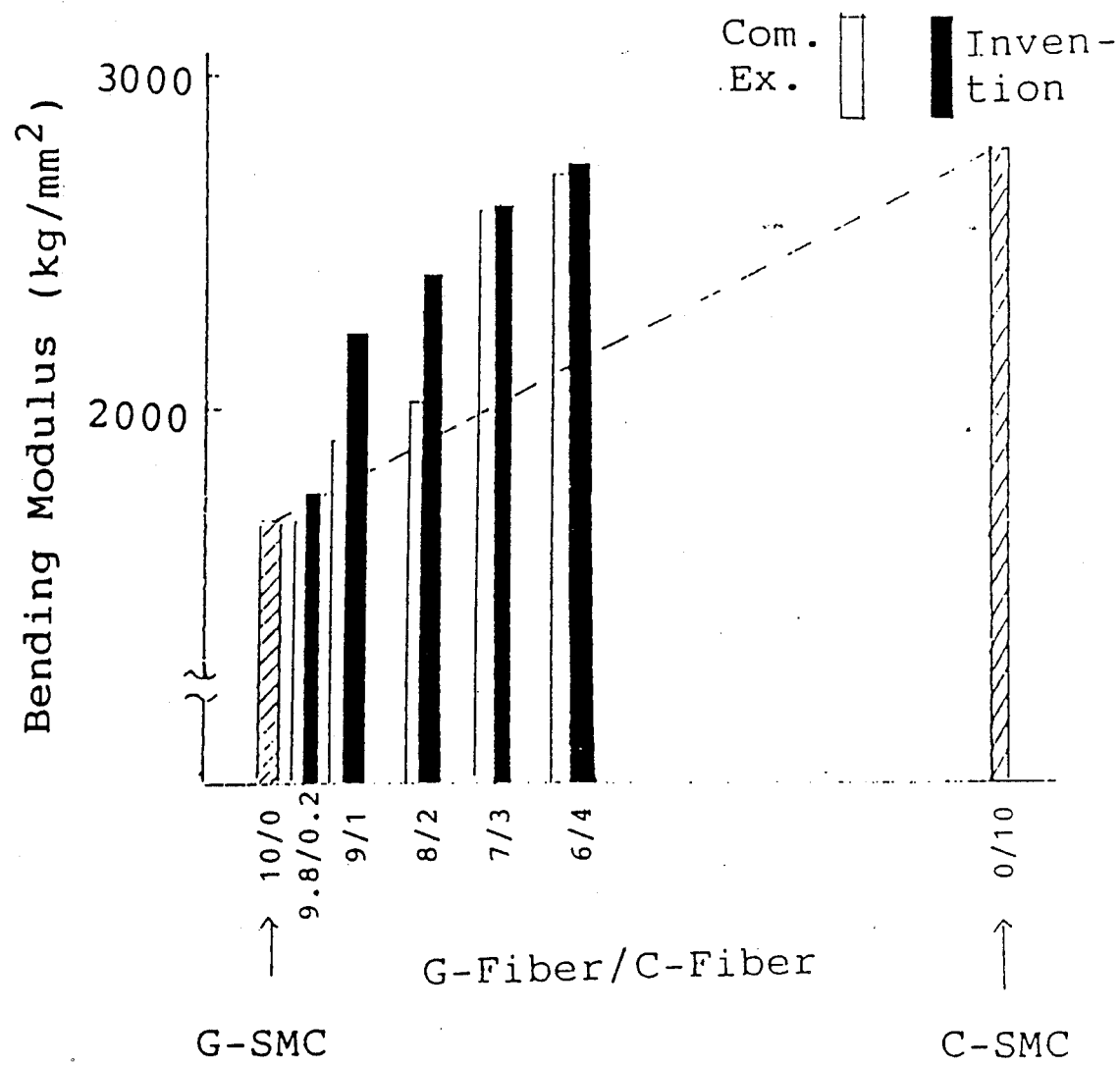
FIG. 4 is a bar chart showing bending modulus of second preferred embodiments according to this invention.
Figure 5:
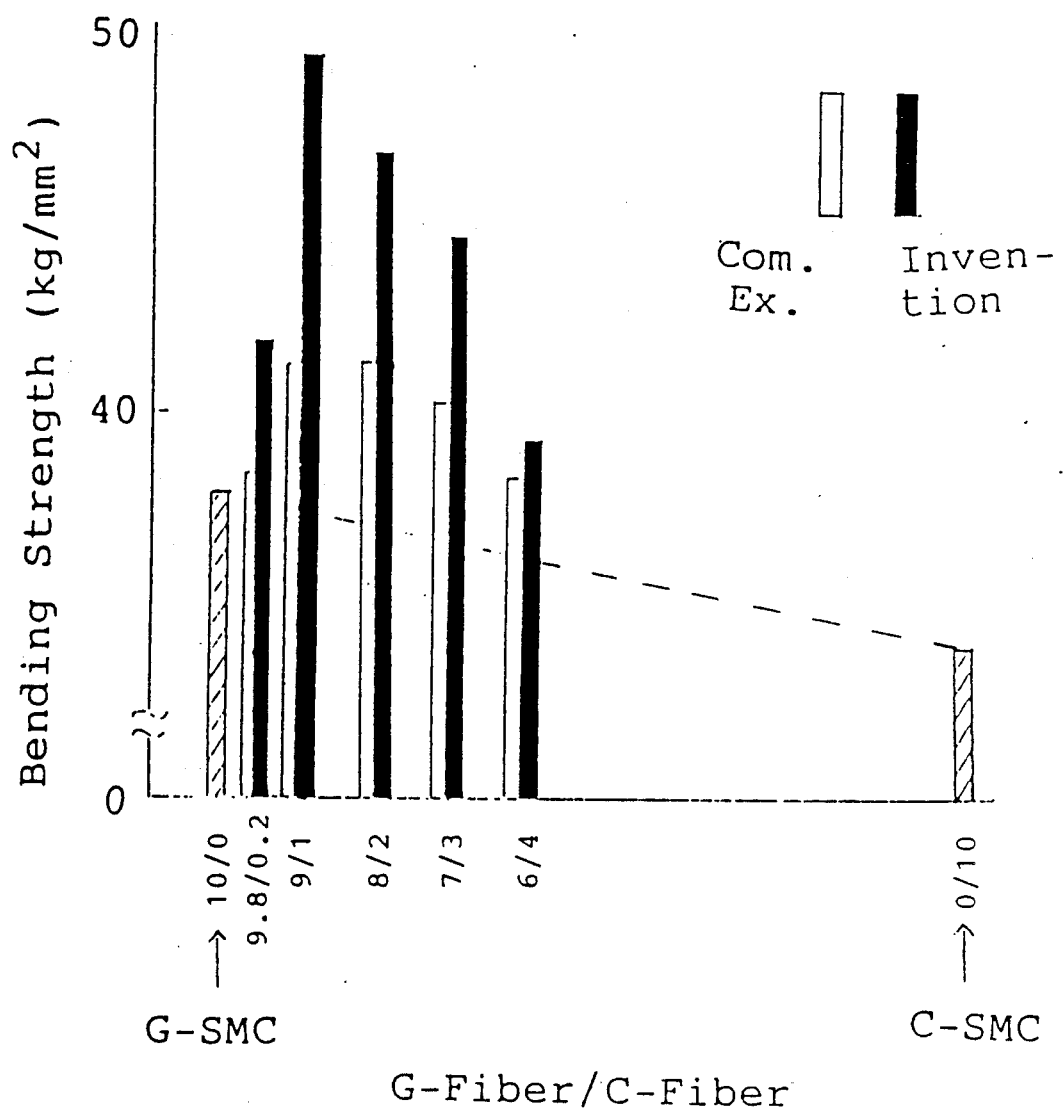
FIG. 5 is a bar chart showing bending strength of second preferred embodiments according to this invention.

Further, the bending modulus and strength in Table 3 are shown in FIGS. 4 and 5 (with the additional data of 9.8:0.2 and 6:4 as to G-fiber/C-fiber). The abscissa shows the ratio of the carbon fiber strand to the glass fiber strand in volume.

In these hybrid SMC, the hybrid SMC of these second preferred embodiments employed the carbon fiber strand comprising 1000 of assembled carbon filaments and the hybrid SMC of the comparative examples employed the carbon fiber strand comprising 12000 of assembled carbon filaments. The former carbon fiber strand had a cross sectional area of 0.05 mm$^2$, and the latter had a cross sectional area of 0.6 mm$^2$. In addition, the length of the chopped strands was 1 inch for both cases. The sum of the volume of the glass fiber strands and carbon fiber strands is constant at 40% by volume with respect to the total volume of the fiber reinforced resin composition taken as 100% by volume.

It is apparent from FIGS. 4 and 5 that the hybrid SMC, in which the carbon fiber chopped strands occupied from 2 to 30% by volume of the total chopped strands volume, show greater hybridizing effect. The hybridizing effect means the difference between arithmetic averages of mechanical properties of G-SMC's and C-SMC's. When the carbon fiber chopped strands occupied from 10 to 20% by volume, the hybridizing effect was remarkable for the bending modulus (See FIG. 4.). When the carbon fiber chopped strands occupied 10% by volume, the hybridizing effect was greatest for the bending strength (See FIG. 5.). Especially, the bending strength of the hybrid SMC of these second preferred embodiments were improved greatly compared with that of the comparative examples. However, when the volume ratio of the carbon fiber chopped strands exceeds the above-mentioned range, the hybridizing effect was no more appreciable in the hybrid SMC of these second preferred embodiments than it was in the comparative examples. Thus, it is understood that the hybridizing effect reaches the maximum value in the above-mentioned range.

Third Preferred Embodiments

These hybrid SMC's of third preferred embodiments were again manufactured by the same manufacturing process described in the Second Preferred Embodiments section. In these hybrid SMC, the ratio of the carbon fiber strand to the glass fiber strand was fixed at 1:9 for all of the third preferred embodiments, and the sum of the carbon fiber strand and the glass fiber strand was gradually varied. The bending strength of these hybrid SMC was evaluated as described above, and results of the bending strength evaluation are shown in FIG. 6.

Figure 6:
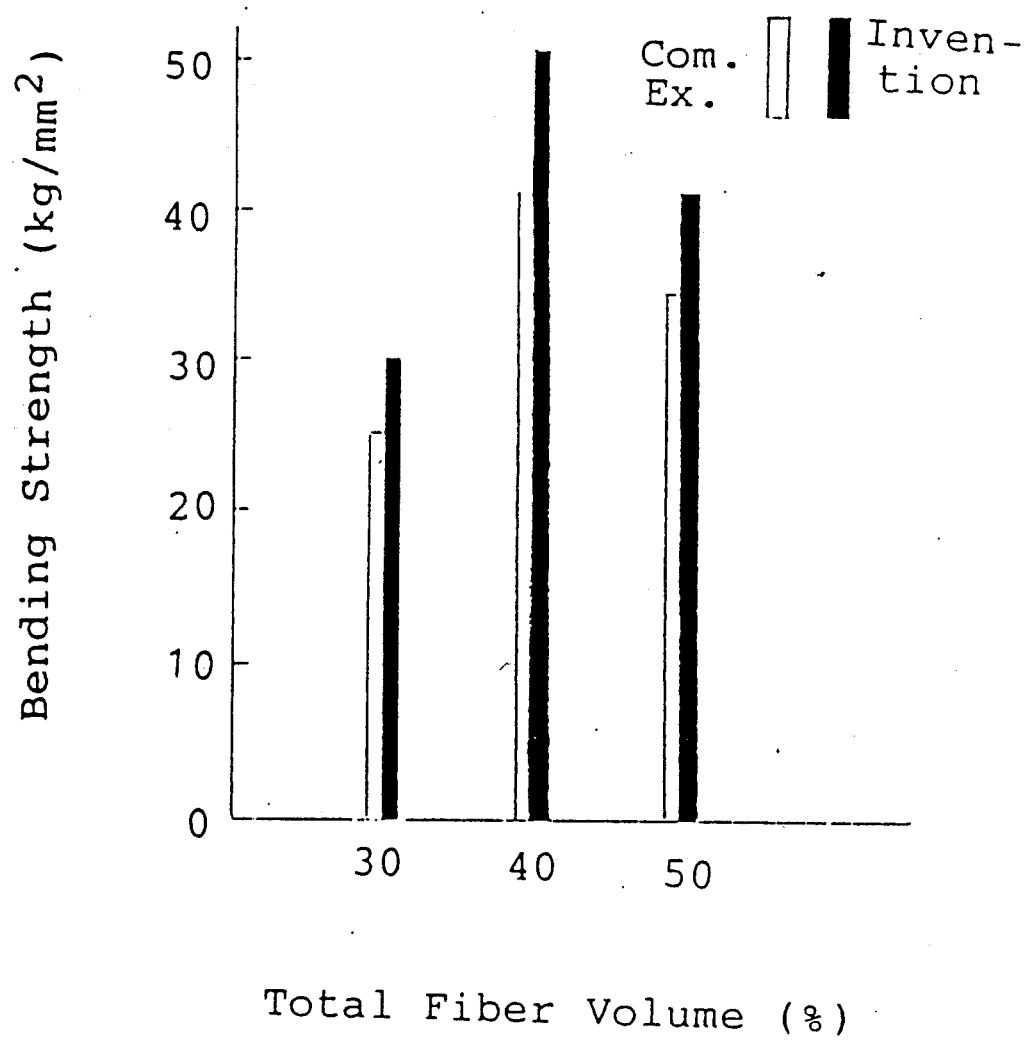
FIG. 6 is a bar chart showing bending strengths of third preferred embodiments according to this invention.

It is understood from FIG. 6 that the hybrid SMC of the third preferred embodiments employing the carbon fiber strand of 1000 assembled number of carbon filaments had the bending strength superior to that of the comparative examples employing the carbon fiber strand of 12000 assembled number of carbon filaments. The hybrid SMC having the sum of the carbon fiber strand and the glass fiber strand by 40% by volume exhibited the greatest bending strength.

Fourth Preferred Embodiments

These hybrid SMC's of fourth preferred embodiments were again manufactured by the same manufacturing process described in the Second Preferred Embodiments section. In these hybrid SMC, the ratio of the carbon fiber strand to the glass fiber strand was fixed at 1:9 for all of the third preferred embodiments, and the sum of the carbon fiber strand and the glass fiber strand was also fixed at 40% by volume. However, the length of the carbon fiber chopped strands and the glass fiber chopped strands was varied from ½ to 3/2 inch. The bending strength of the hybrid SMC was evaluated as described above, and results of the bending strength evaluation are shown in FIG. 7.

Figure 7:
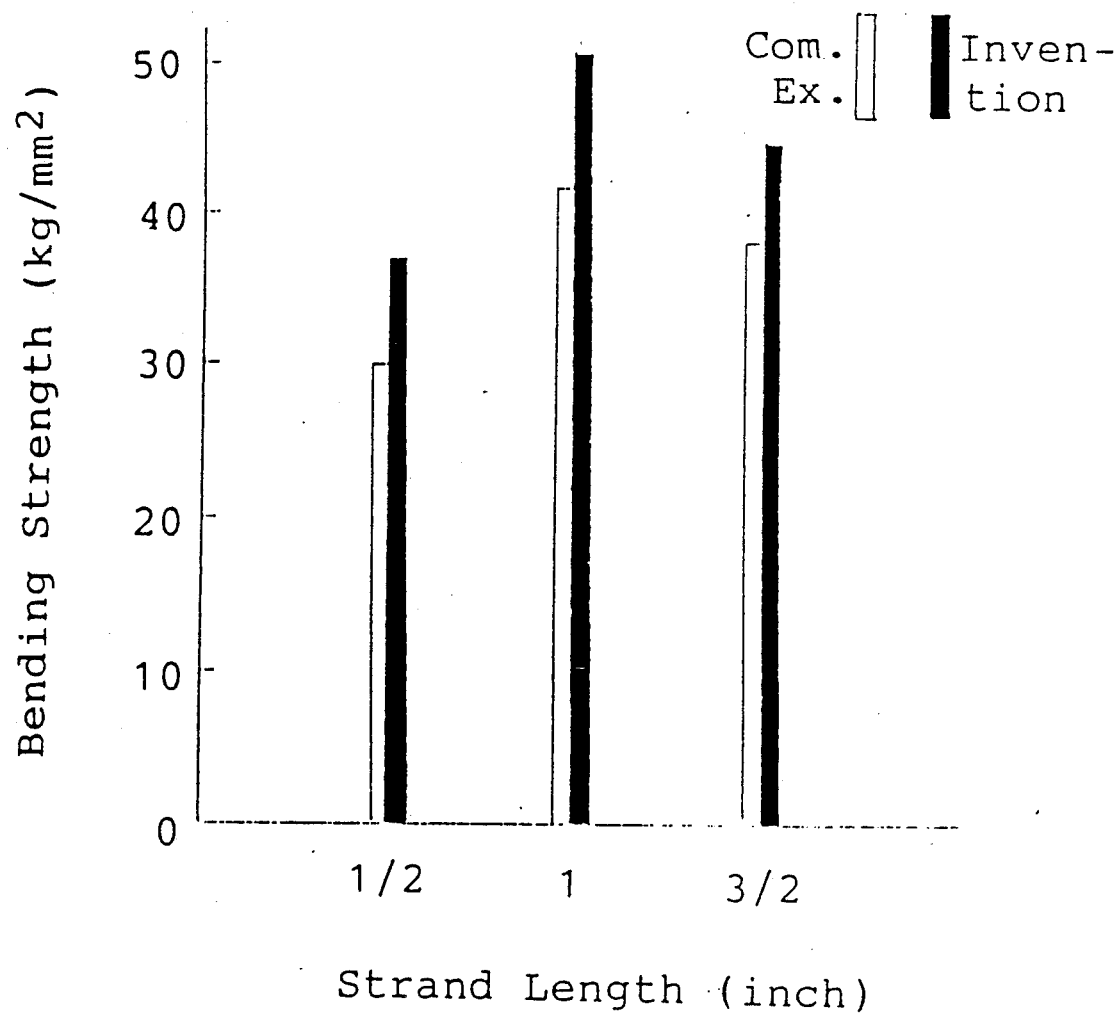
FIG. 7 is a bar chart showing bending strengths of fourth preferred embodiments according to this invention.

According to FIG. 7, the hybrid SMC of the fourth preferred embodiments employing the carbon fiber strand of 1000 assembled number of carbon filaments had the bending strength superior to that of the comparative examples employing the carbon fiber strand of 12000 assembled number of carbon filaments. The hybrid SMC of the fourth preferred embodiments comprising the carbon fiber chopped strands and the glass fiber chopped strands having the length of 1 inch exhibited the greatest bending strength.

Fifth Preferred Embodiments

In the hybrid SMC, the resin comprising epoxy resin instead of the unsaturated polyester was employed. Other than this arrangement, the hybrid SMC's of fifth preferred embodiments were again manufactured with the same materials and by the same manufacturing process described in the Second Preferred Embodiments section while varying the ratio of the carbon fiber strand to the glass fiber strand. The bending strength of the hybrid SMC was evaluated as described above, and results of the bending strength evaluation are shown in FIG. 8.

Figure 8:
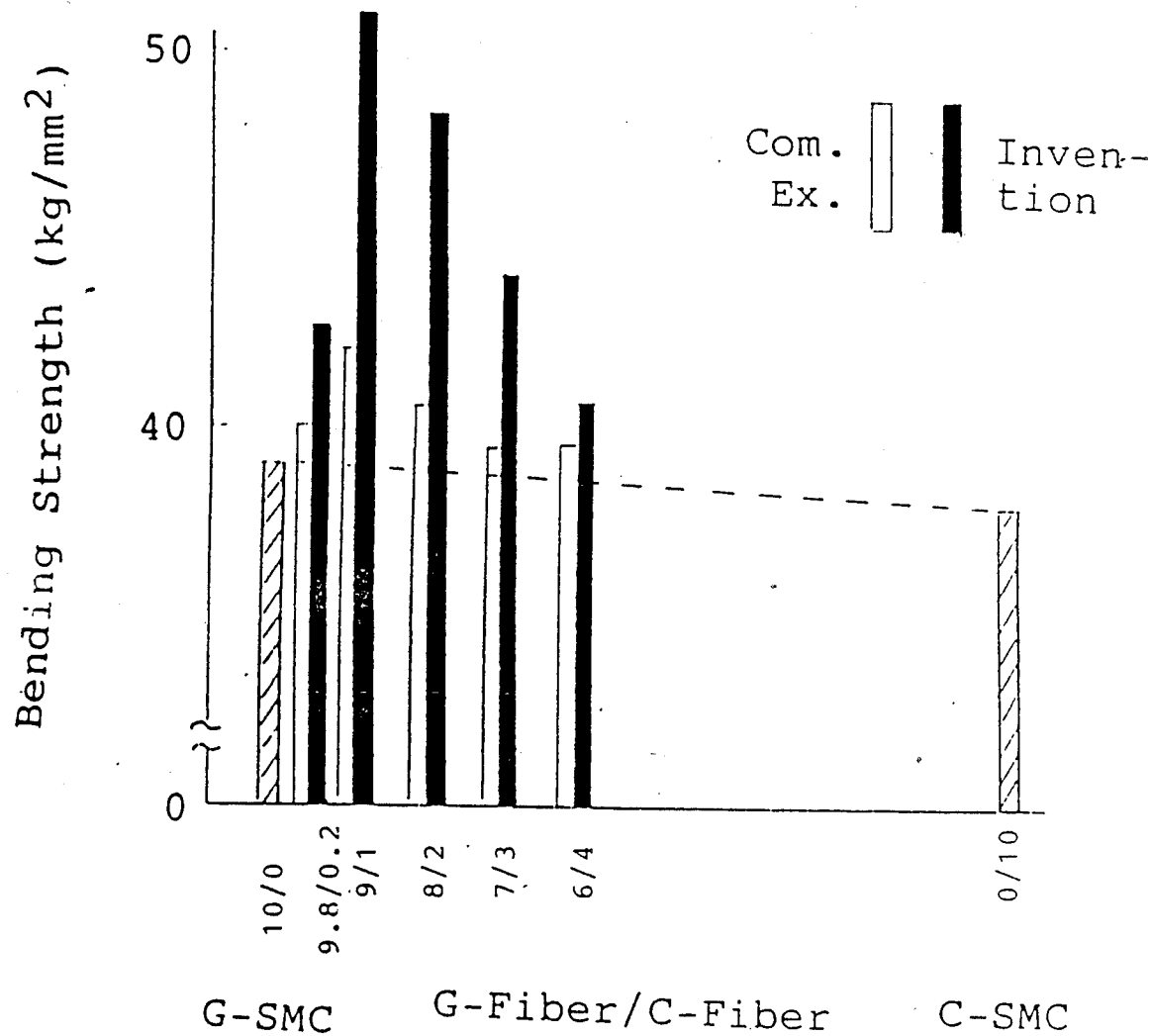
FIG. 8 is a bar chart showing bending strengths of fifth preferred embodiments according to this invention.

As shown in FIG. 8, the hybrid SMC of the fifth preferred embodiments had remarkably improved bending strength. When the preferred embodiments comprised by 2 to 30% by volume with respect to the volume sum of the carbon fiber strand and the glass fiber strand, the bending strength of the fifth preferred embodiments was far greater than that of the comparative examples.

Sixth Preferred Embodiments

In the hybrid SMC, the resin comprising epoxy resin instead of the unsaturated polyester was employed. Other than this arrangement, the hybrid SMC of sixth preferred embodiments were manufactured in a manner similar to that of the first preferred embodiments while varying the cross sectional area of the carbon fiber strand. The bending strength of the hybrid SMC was evaluated as described above, and results of the bending strength evaluation are shown in FIG. 9.

Figure 9:
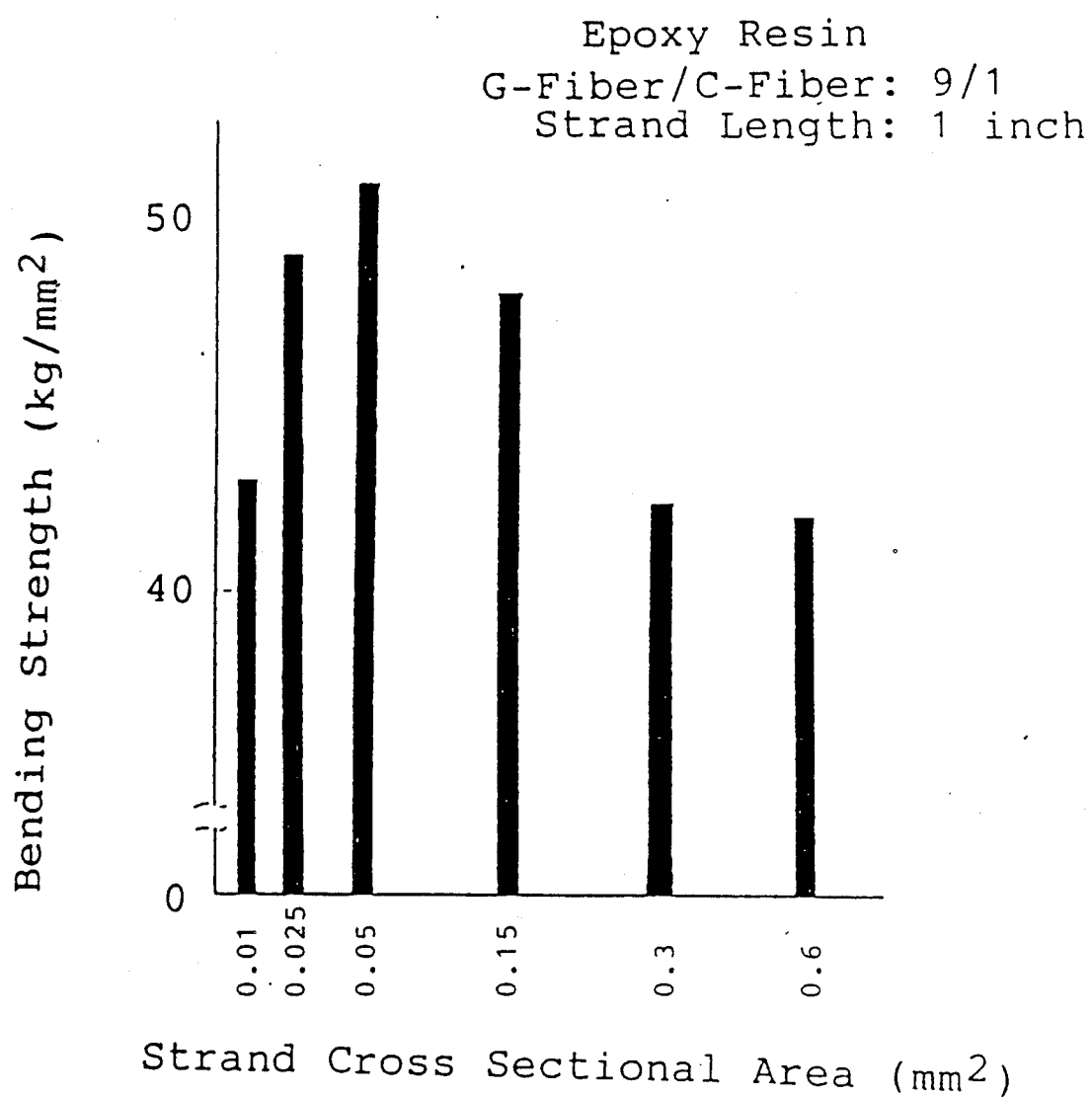
FIG. 9 is a bar chart showing bending strengths of sixth preferred embodiments according to this invention.

As can be clearly seen from FIG. 9, the bending strength of the preferred embodiments was improved sharply in the case where the cross sectional area of the employed carbon fiber strand fell in the range of from 0.01 to 0.15 mm$^2$. The preferred embodiment comprising the carbon fiber strand having the cross sectional area of 0.05 mm$^2$ exhibited the maximum bending strength.

Seventh Preferred Embodiments

Hybrid SMC's of these preferred embodiments were manufactured by the same manufacturing process for manufacturing the first preferred embodiments. However, the ratio of the carbon fiber strand to the glass fiber strand was fixed at 1:9, and the sum of the carbon fiber strand and the glass fiber strand was fixed at 40% by volume with respect to the total volume of the fiber reinforced resin composition taken as 100% by volume.

Cross sections of thus manufactured hybrid SMC were photographed at magnification $\times 25$, and are shown in FIGS. 10 through 13. The number of the assembled filaments was 1000 for the hybrid SMC shown in FIGS. 10 and 12, and the number was 12000 for the hybrid SMC shown in FIGS. 11 and 13. The photographs in FIGS. 12 and 13 were taken in the lateral direction of the hybrid SMC after breaking them.

By comparing FIG. 10 with FIG. 11, and FIG. 12 with 13, it is apparent that the carbon fiber chopped strands are finely dispersed and the cracks branch away and propagate gradually in the present invention.

Having now fully described the invention, it will be apparent to one of ordinary skill in the art that many changes and modifications can be made thereto without departing from the spirit or scope of the invention as set forth herein.

What is claimed is:

1. A composition of a fiber reinforced plastics comprising a resin and effective amounts of chopped strands dispersed in said resin, wherein said chopped strands comprise glass fiber chopped strands, composed of cut assemblies of glass filaments and high modulus inorganic filaments having higher elastic modulus than said glass filaments and having at most 3000 assembled filaments, wherein the mixing ratio of said high modulus inorganic filaments is from 2 to 30% by volume with respect to the total volume of said glass filaments and said high modulus filaments in said reinforced plastics taken as 100% by volume, wherein the mixing ratio of the total of said glass fiber chopped strands and said high modulus chopped strands is from 30 to 50% by volume with respect to the total volume of said fiber reinforced plastics taken as 100% by volume, wherein the length of said chopped strands falls in the range of from ½ to 3/2 inch, and wherein the cross section area of said high modulus chopped strands falls in the range of from 0.01 to 0.15 mm².

2. A composition of a fiber reinforced plastics according to claim 1, wherein the length of said chopped strands falls in the range of from ¼ to 2 inch.

3. A composition of a fiber reinforced plastics according to claim 1, wherein said resin comprises at least one thermosetting resin selected from the group consisting of unsaturated polyester resin, epoxy resin and vinyl ester resin.

* * * * *